(12) United States Patent
Kalyani et al.

(10) Patent No.: US 9,231,836 B2
(45) Date of Patent: Jan. 5, 2016

(54) ROBUST CHANNEL ESTIMATION OF OFDM SYSTEMS

(75) Inventors: Sheetal Kalyani, Chennai (IN); Lakshminarayanan Raghavendran, Chennai (IN); Krishnamurthi Giridhar, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 406 days.

(21) Appl. No.: 13/702,074

(22) PCT Filed: Jun. 11, 2010

(86) PCT No.: PCT/IN2010/000400
§ 371 (c)(1),
(2), (4) Date: Jan. 14, 2013

(87) PCT Pub. No.: WO2011/154964
PCT Pub. Date: Dec. 15, 2011

(65) Prior Publication Data
US 2013/0215826 A1 Aug. 22, 2013

(51) Int. Cl.
*H04J 11/00* (2006.01)
*H04L 12/26* (2006.01)
*H04L 25/02* (2006.01)

(52) U.S. Cl.
CPC .............. *H04L 43/04* (2013.01); *H04L 25/022* (2013.01); *H04L 25/0204* (2013.01); *H04L 25/0224* (2013.01)

(58) Field of Classification Search
None
See application file for complete search history.

(56) References Cited

U.S. PATENT DOCUMENTS

2003/0043887 A1* 3/2003 Hudson .......................... 375/144
2011/0003606 A1* 1/2011 Forenza et al. ................ 455/501

* cited by examiner

*Primary Examiner* — Kevin C Harper
*Assistant Examiner* — Derrick V Rose
(74) *Attorney, Agent, or Firm* — Rahman LLC

(57) ABSTRACT

A system and method for estimating a channel in wireless communication systems using Orthogonal Frequency Division Multiplexing (OFDM). From the received OFDM symbols, Maximum Likelihood (ML) estimate of the channel frequency response is obtained at the pilot locations. A hypothesis test is performed on the ML estimates and the outcome of the hypothesis test is used to decide a shrinkage target. Biased estimation methods are used to shrink the ML estimates towards the shrinkage target to obtain better estimates of the channel frequency response at the pilot locations and these estimates are interpolated using a Filter to get a set of complete estimates of the channel over the resource block. The Filter is an Empirical Weiner Filter or a robust 2D-MMSE filter and the biased estimation is done using either a James-Stein (JS) estimator or a shrinkage estimator or an empirical Bayes estimator.

47 Claims, 10 Drawing Sheets

ROBUST CHANNEL ESTIMATION OF OFDM SYSTEMS

The present application is based on, and claims priority from, a PCT Application Number, PCT/IN2010/000400 filed on 11 Jun. 2010, the disclosure of which is hereby incorporated by reference herein.

TECHNICAL FIELD

The embodiments herein relate to wireless communication systems and, more particularly, to estimation of channels in wireless communication systems.

BACKGROUND

In pilot aided channel estimation schemes, optimal estimation of the communication channel requires knowledge of the channel correlation functions in time and frequency which are seldom known accurately. Interestingly, even when the channel correlation functions are known accurately, ill-conditioning of the computed covariance matrices degrade the performance of the optimum Minimum Mean Square Error (MMSE) (also called Wiener) filter.

In most practical systems the numbers of the pilots are kept minimal to reduce the resource overhead during data transmissions. In the face of such demanding requirements it is desired to obtain channel estimates which are reasonably close to optimal estimates even when (1) the statistics are not known a priori or are time varying, (2) systems are required to operate on minimal number of pilots and/or at low Signal to Noise ratio (SNR) and/or at low Signal to Noise plus Interference Ratio (SINR) and (3) the MMSE filters suffer from performance degradation due to rank deficiency of the computed correlation matrices.

Robust channel estimation methods have been proposed to address the issues faced during channel estimation. One approach is to use the Wiener filter assuming uniform ideally support limited scattering function that is a uniform power delay profile (PDP) and uniform support limited Doppler spectrum is assumed. This is supposed to be the worst case PDP and Doppler power spectrum and hence a MMSE filter designed under such assumptions is supposed to work well for a wide range of PDPs and Doppler spectrums. We call such a MMSE filter as the robust 2D-MMSE filter. However, in the case of finite number of pilots this robust 2D-MMSE filter may not perform well.

SUMMARY

In view of the foregoing, an embodiment herein provides a method for estimating a channel in wireless communication systems using Orthogonal Frequency Division Multiplexing (OFDM). Maximum Likelihood (ML) estimate of the channel frequency response is obtained at the pilot's symbol locations. A hypothesis test is performed on the ML estimates to determine the variability in the actual channel at the pilot locations. Based on the outcome of the hypothesis test a shrinkage target is chosen. Biased estimation techniques are then applied on the ML channel frequency response estimate to obtain refined estimates of the channel on the pilot locations. The shrinkage target towards which the ML estimate is shrunk is chosen using the information available from the hypothesis test or from other information available to the user. Finally the refined estimates at the pilot locations are interpolated using either an Empirical Weiner Filter or a robust 2D-MMSE filter to obtain the estimates on to the rest of the time-frequency grid.

The biased estimator shrinks the ML estimate towards the origin or to a value close to the actual value or towards a specific shrinkage target. The biased estimator can be a shrinkage estimator, a James-Stein estimator or it can be an empirical Bayes estimator. The hypothesis test is done to determine frequency and time selectivity of the channel over a Resource Block (RB) based on a function of the ML estimates. The hypothesis test is done to determine frequency selectivity of the channel is independent of the hypothesis test is done to determine time selectivity of the channel. Alternatively a hypothesis test can be done to determine frequency and time selectivity of the channel over a Resource Block based on phase of the ML estimates. The probability density function (pdf) of angle between two vector perturbed by Gaussian noise is used to setup the hypothesis test. The shrinkage target can be obtained based on the outcome of the hypothesis test. The shrinkage target is a function of the ML channel frequency response estimates. An auto-correlation and cross correlation vectors are used to compute the set of complete estimates of the channel frequency response over the time-frequency block of interest.

Embodiments further disclose a system for estimating a channel in wireless communication systems using Orthogonal Frequency Division Multiplexing (OFDM). The system performs estimation on received OFDM symbols to obtain Maximum Likelihood estimate of the channel frequency response on the pilot locations, performs a hypothesis test on the ML estimates based on whose outcome a shrinkage target is obtained, performs a biased estimation method by which the ML estimates are shrunk towards the shrinkage target and interpolates the biased estimates using a Filter to get a set of complete estimates of the channel. The Filter is an Empirical Weiner Filter or a robust 2D-MMSE filter. The system is adapted for using a James-Stein (JS) estimator or a shrinkage estimator or an empirical Bayes estimator to perform the biased estimation. The system performs the hypothesis test to determine frequency and time selectivity of the channel over a Resource Block based on a function of the ML estimates. The system also performs the hypothesis test to determine frequency and time selectivity of the channel over a Resource Block based on phase of the ML estimates.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
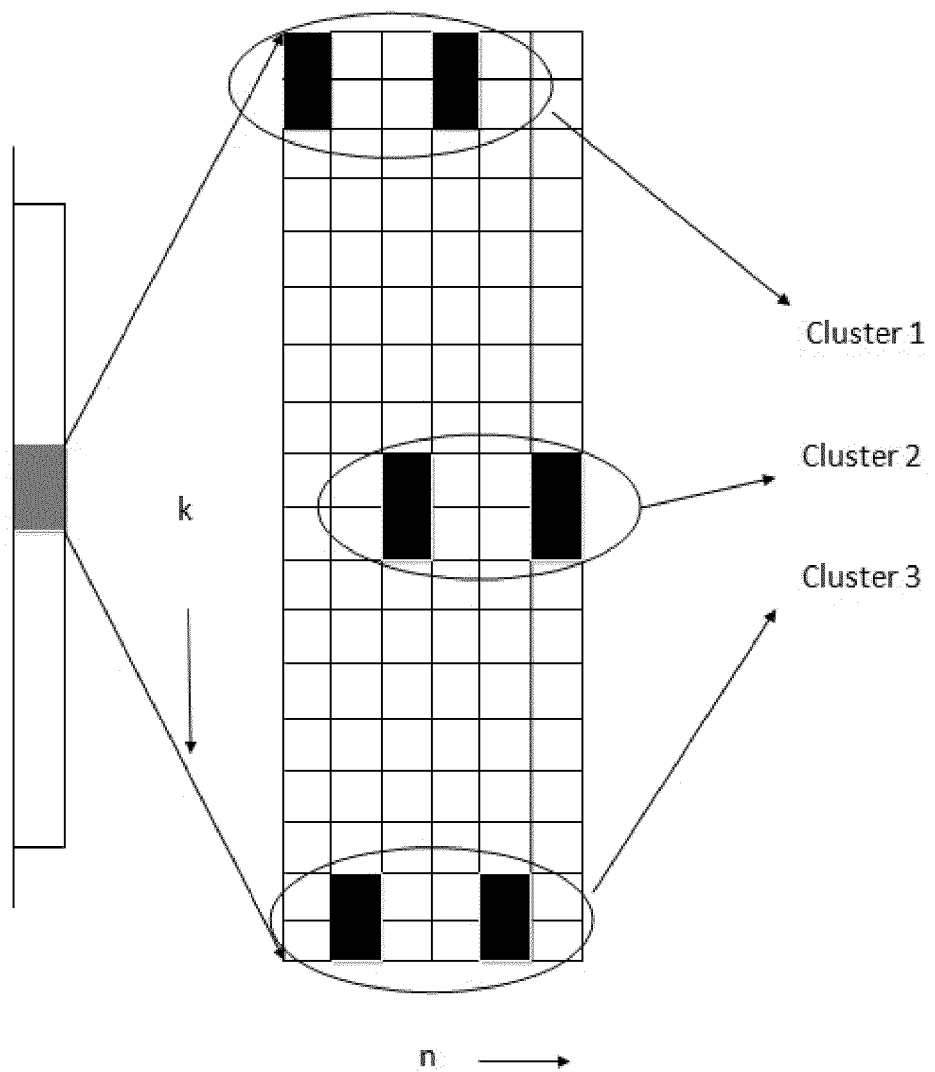
FIG. 1 illustrates a diagram of an OFDM resource block (RB) structure, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method for estimating the channel in Orthogonal Frequency Division Multiplexing (OFDM) systems by using biased estimation along with hypothesis testing. Good estimates of the channel are obtained with minimal use of pilot signals, in the presence of unreliable statistical information. Referring now to the drawings, and more particularly to FIGS. 1 through 10, where similar reference characters denote corresponding features consistently throughout the figures, there are shown embodiments.

In OFDM systems, the transmit data is grouped into blocks of data. Further, the block: of data are modulated onto multiple subcarriers using the Inverse Discrete Fourier Transform (IDFT). A cyclic prefix (CP) is added to each block of data to facilitate suppression of inter block interference. At the receiver, the CP is removed and the received data is demodulated using the Discrete Fourier Transform (DFT). The OFDMA-based broadband wireless communication system can be considered to be having $N_t$ transmit and $N_r$ receive antennas. The blocks of data into which transmit data is grouped are called as Resource Blocks (RB). Each RB is composed of P subcarriers and Q OFDM symbols, and an RB is called a localized RB when the P subcarriers are contiguous and an RB is called a distributed RB when the P subcarriers span the entire frequency band. In the localized mode, the RBs can be either contiguous or distributed over the entire band. For example, the size of P and Q are 18 and 6, respectively for IEEE 802.16m standard, and 12 and 7, respectively for LTE standard. Each RB consists of pilot subcarriers interspersed with data sub-carriers as shown in FIG. 1. In FIG. 1 the dimension of the RB is 18×6 and the system comprises 18 subcarriers along frequency and 6 symbols over time. In FIG. 1 the shaded regions show the location of pilot signals. In this example the numbers of pilots are twelve since we are assuming a two transmit antenna system operating in virtual antenna mode.

The received OFDM symbol at the receiver, after DFT can be represented as $$Y_{k,n} = X_{k,n} H_{k,n} + V_{k,n} \quad \text{Equation 1}$$

Where $Y_{k,n}$ is the received data corresponding to the $k^{th}$ subcarrier and in the $n^{th}$ OFDM symbol, $H_{k,n}$ is the corresponding channel frequency response and $V_{k,n}$ is complex Additive Gaussian Noise. The OFDM system representation on the pilots in a RB is given by $$Y_p = X_p H_p + V_p \quad \text{Equation 2}$$

Here p as a subscript denotes that the symbol corresponds to a pilot location. $Y_p \equiv [Y_{1,1} \, Y_{2,1} \, Y_{17,2} \, Y_{18,2} \, Y_{9,3} \, Y_{10,3} \, Y_{1,4} \, Y_{2,4} \, Y_{17,5} \, Y_{18,5} \, Y_{9,6} \, Y_{10,6}]^T \in X^p$, The first subscript denoting the subcarrier index and the second subscript denoting OFDM symbol number, as shown in FIG. 1. Here $X_p \in X^{p \times p}$ is a diagonal matrix with the diagonal values being entries that contain the pilot symbols and $H_p \in X^{p \times 1}$ is the vector of channel frequency response seen at the pilot locations. The zero forcing estimate of the channel frequency response at the pilot locations which is also the Maximum Likelihood (ML) estimate of the channel frequency response for the case of white Gaussian noise is given by $$\hat{H}_{ML,p} = X_p^{-1} Y_p \quad \text{Equation 3}$$

And it is a vector of dimension p×1.

The optimal mean squared error estimates of the channel over the RB are given by the optimal 2DMMSE filter (optimal Wiener filter). The optimal MMSE (Wiener) filter estimates of the channel are given by $$\hat{H}_{MMSE} = W \hat{H}_{ML,p} \quad \text{Equation 4}$$

Where the Weiner Filter (WF), $W \in X^{p \times PQ}$, is the solution to the equation $R_{\hat{H}_{ML,p}, \hat{H}_{ML,p}} W = R_{\hat{H}_{ML,p}, H}$. Here $R_{\hat{H}_{ML,p}, \hat{H}} (\equiv E[\hat{H}_{ML,p} H_p^H]) \in \mathbb{C}^{p \times PQ}$, and $R_{\hat{H}_{ML,p}, \hat{H}_{ML,p}} (\equiv E[\hat{H}_{ML,p} \hat{H}_{ML,p}^H]) = R_{H_p, H_p} + \sigma_v^2 I) \in \mathbb{C}^{p \times p}$ are t cross-correlation and auto-correlation matrices respectively, where $H_p \in X^{p \times 1}$, is the vector consisting of the actual channel frequency response samples at the pilot locations in the RB. The auto-correlation values are with reference to the ML channel frequency response estimates and cross-correlation values considered are between actual channel and ML estimate. The WF is given by $$W = R_{\hat{H}_{ML,p}, H} (R_{H_p, H_p} + (\sigma_v^2 + \lambda^2) I)^{-1} \quad \text{Equation 5}$$

The input correlation matrix, $R_{H_p, H_p}$, in equation 5 is block Toeplitz and is nearly rank deficient and hence requires the stabilizing factor, $\lambda^2 I$ at high Signal To Noise Ratios (SNRs). Without the stabilizing factor, at high SNRs, the optimal WF may suffer degradation in the MSE performance due to loss of numerical rank of $R_{\hat{H}_{ML,p}, \hat{H}_{ML,p}}$.

The filtering of $\hat{H}_{ML,p}$ to obtain $\hat{H}_{MMSE}$ in equation 4 can be viewed as interpolating the ML channel estimates onto the rest of the time-frequency grid. The correlation functions used in equation 4 require the knowledge of the channel Power Delay Profile (PDP) and fade characteristics. As the wireless system is put to use under different operating conditions it is seldom possible to know the channel profile and statistics.

It is observed from equation 3 and equation 4 that the overall estimation Mean Square Error (MSE) performance depends on the choice of the estimator the pilots and the interpolating filter. Hence the task of obtaining the channel estimates over the grid can be split into simpler problems of designing the channel estimator on the pilots for a lower MSE and designing an optimal interpolation filter that has the least interpolation error as well as good numerical robustness.

The use of biased estimation results in obtaining estimates which have a lower estimation MSE with very few pilots. A test of hypothesis in conjunction with biased estimation techniques is used to obtain channel estimates. The use of hypothesis testing along with biased estimation results in improved MSE and Bit Error Rate (BER) performance. The use of hypothesis testing along with biased estimation does not require any a priori information.

Figure 2:
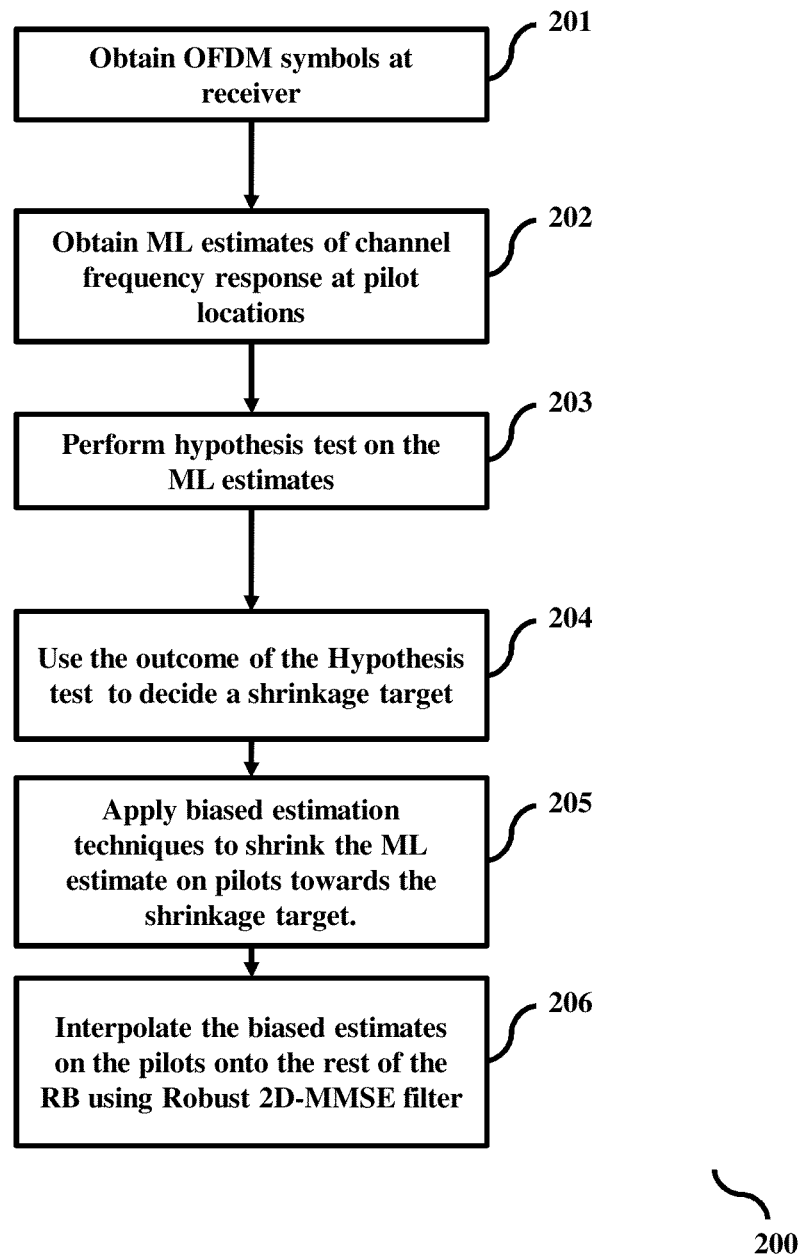
FIGS. 2 and 3 are flowcharts depicting methods for estimating the channel by a combination of biased estimation with hypothesis testing, according to an embodiment herein.

FIG. 2 is a flowchart depicting a method for estimating the channel. In communication systems, the estimation of the channel helps in determining the channel properties of the communication link. The channel estimation information can describe how a signal would propagate from the transmitter to the receiver and represents the combined effect of the channel on the signal. For example, the channel estimation information may describe the effects of scattering, fading and power decay on the signal. The channel can be estimated by using biased estimation in conjunction with hypothesis testing or without hypothesis testing.

Figure 3:
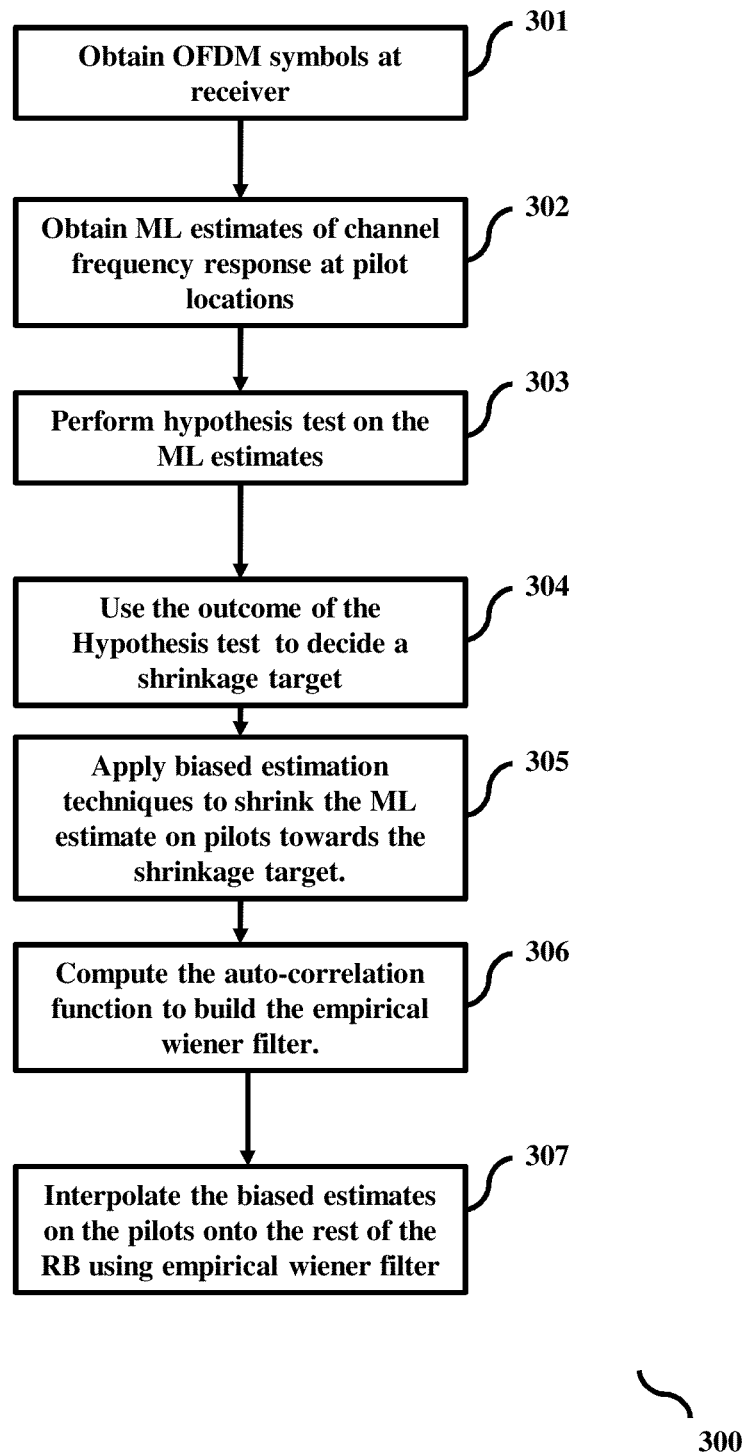

FIGS. 2 and 3 are flowcharts depicting a method for estimating the channel by a combination of biased estimation with hypothesis testing. To estimate the channel using biased estimation in conjunction with hypothesis testing, the OFDM symbols are obtained (201) at the receiver. The received OFDM symbol at the receiver, after DFT can be represented by $$Y_{k,n}X_{k,n}H_{k,n}+V_{k,n}.$$

Where $Y_{k,n}$ is the received data corresponding to the kth subcarrier and in the nth OFDM symbol, $H_{k,n}$ is the corresponding channel transfer function and $V_{k,n}$ is complex Additive Gaussian Noise. The OFDM system representation on the pilots in a RB is given by $$Y_p = X_p H_p + V_p$$

Where $Y_p = [Y_{1,1} \ Y_{2,1} \ Y_{17,2} \ Y_{18,2} \ Y_{9,3} \ Y_{10,3} \ Y_{1,4} \ Y_{2,4} \ Y_{18,5} \ Y_{9,6} \ Y_{10,6}]^T \in X^{p \times 1}$ for the specific example pilot design shown in FIG. 1, where the first subscript denotes the subcarrier index and the second subscript denotes OFDM symbol number. ML estimates of the channel frequency response on the pilot locations are obtained (202). A hypothesis test is performed (203) on the ML estimates to determine frequency and/or time selectivity over the RB. Alternatively a hypothesis test can be performed on the phase of the ML estimates to determine frequency and/or time selectivity over the RB. Based on the hypothesis test the shrinkage target for the biased estimator is decided (204). Biased estimators can attain a lower MSE by trading off bias with variance. Refined channel frequency response estimates on pilot locations can be obtained by using a biased estimator to shrink the ML estimate towards the shrinkage target (205). The refined (biased) channel frequency response estimates are interpolated using a robust 2D-MMSE Filter to get the complete channel frequency response estimates over time-frequency block (206). The various actions in method 200 must be performed in the order presented. Further, in some embodiments, some actions listed in FIG. 2 may be omitted.

FIG. 3 is a flowchart depicting a method for estimating the channel. To estimate the channel using biased estimation in conjunction with hypothesis testing, the OFDM symbols are obtained (301) at the receiver. The received OFDM symbol at the receiver, after DFT can be represented by equation 1. The OFDM system representation on the pilots in a RB is determined as given by equation 2. ML estimates of the channel frequency response at the pilot locations are then obtained (302). Minimizing the MSE is equivalent to minimizing the sum of the variance and bias of the estimator. Minimum Variance Unbiased Estimators minimize the MSE with zero bias as the constraint and achieve the Crammer-Rao Bound (CRB). Biased estimators can attain a lower MSE by trading off bias with variance. The ML estimates of the channel frequency response on the pilots are given by equation 3. The ML estimate has a covariance matrix denoted by Q. The biased estimator can be any shrinkage estimator, empirical Bayes estimator, and more generally any estimator of the form $$\hat{H}_{gen,p} = \overline{H} + \left(1 - \frac{r(F)}{F}\right)(\hat{H}_{ML,p} - \overline{H}) \quad \text{Equation 6a}$$

$$\hat{H}_{gen,p} = \overline{H} + \max\left(0, 1 - \frac{r(F)}{F}\right)(\hat{H}_{ML,p} - \overline{H}) \quad \text{Equation 6b}$$

Where $F=(\hat{H}_{ML,p}-\overline{H})^H Q^{-1}(\hat{H}_{ML,p}-\overline{H})$ and $\overline{H}$ is the shrinkage target. Here $r(\cdot)$ is a monotone non-decreasing function with the condition that $0 \leq r(\cdot) \leq 2(p-2)/(n+2)$. Here p is the number of parameters to be estimated and is equal to the dimension of the ML estimates and Q is the covariance matrix of the ML estimate. Here max(a,b) denotes maximum of a and b.

The biased estimation can be done using an estimator of the form $$\hat{H}_{gen2,p} = \overline{H} + \left(I - \frac{r(F)}{F}V^{-1}Q^{-1}\right)(\overline{H}_{ML,p} - \overline{H}) \quad \text{Equation 6c}$$

or $$\hat{H}_{gen2,p} = \overline{H} + \left(I - \frac{r(F)}{F}V^{-1}Q^{-1}\right)^+ (\overline{H}_{ML,p} - \overline{H}) \quad \text{Equation 6d}$$

where $\hat{H}_{ML,p}$ is said ML estimate, $F=(\overline{H}_{ML,p}-\overline{H})^H Q^{-1}V^{-1}Q^{-1}(\overline{H}_{ML,p}-\overline{H})$ where $r(\cdot)$ is an absolutely continuous function with the condition that $0 \leq r(F) \leq 2(p-2)$, p is the number of parameters to be estimated, $\overline{H}$ is a shrinkage target of the same dimension as said ML estimates. I is an identity matrix, $\hat{H}_{ML,p}^{(j)}$ denotes the jth ML estimate from n independent identically distributed ML estimates (each with covariance matrix Q) of the same channel frequency response, $\overline{H}_{ML,p}$ is the mean of the n ML estimates, V is the weighting matrix of the weighted quadratic cost function being minimized. Here $$\left(I - \frac{r(F)}{F}V^{-1}Q^{-1}\right)^+ = $$
$$P^{-1}\text{diag}\left[\max\left(0, 1 - \frac{r(F)}{F}d_1^{-1}\right), \ldots, \max\left(0, 1 - \frac{r(F)}{F}d_p^{-1}\right)\right]P$$

where P is on n singular matrix such that $PV^{-1}P=I$ and $PQ^{-1}P=D=\text{diag}(d_1, \ldots, d_p)$.

The biased estimation is done using an estimator which is given component wise by $$\hat{H}_{gen1,p,i} = \overline{H}_i + \left(1 - \frac{(p-2)S}{(n+2)T_i}\right)(\hat{H}_{ML,p,i} - \overline{H}_i) \quad \text{Equation 6e}$$

or $$\hat{H}_{gen1,p,i} = \overline{H}_i + \max\left(0, 1 - \frac{(p-2)S}{(n+2)T_i}\right)(\hat{H}_{ML,p,i} - \overline{H}_i) \quad \text{Equation 6f}$$

where, p is the number of parameters to be estimated and S is distributed as noise variance times a chi square random variable of n degrees of freedom and $T_i = (\alpha-1)(\hat{H}_{ML,p,i}-\overline{H}_i)^H(\hat{H}_{ML,p}-\overline{H}_i) + (H_{ML,p}-\overline{H})^H(\hat{H}_{ML,p}-\overline{H})$ where $\alpha \leq p/2$ and $\overline{H}$ is a shrinkage target of the same dimension as said ML estimates The shrinkage target can be specified for any biased estimator. It indicates to the biased estimator some knowledge of the underlying structure of the parameter vector (in our case the channel frequency response at the pilot locations is the parameter vector) being estimated. The shrinkage target can be a function of the ML estimate itself or it can be obtained from some apriori information available to the user.

Another biased estimator, namely the James-Stein (JS) estimator has the channel frequency response estimates at the pilot locations given by $$\hat{H}_{JS,p} = \left(1 - \frac{(\tilde{p}-2)}{\hat{H}_{ML,p}^H (Q^{-1})_{ML,p}}\right) \hat{H}_{ML,p} \quad \text{Equation 7}$$

Where $$\tilde{p} = \frac{tr(Q)}{\lambda_{max}(Q)}$$

and Q is the nonsingular covariance matrix of the ML estimate with tr(Q) denoting trace of the matrix Q and $\lambda_{max}(Q)$ denoting the maximum eigenvalue of Q.

A positive part JS estimator is used to further improve the performance of the estimator. The positive part JS estimator assumes that the weighting factor is a positive quantity and hence does not change the sign of the estimate. The positive part JS estimate is given by $$\hat{H}_{JS,p} = \left(1 - \frac{(\tilde{p}-2)}{\hat{H}_{ML,p}^H Q^{-1} \hat{H}_{ML,p}}\right)^+ \hat{H}_{ML,p} \quad \text{Equation 8}$$

Where $(X)^+$ is equal to X if X>0 else it is equal to zero. The JS estimator tries to mimic an empirical Bayesian estimator. When the actual value of parameter to be estimated lies close to the origin, the JS estimator in equations 7 and 8 exhibits a markedly improved performance since it shrinks the ML estimate towards the origin. The approach to obtaining an improved performance for the JS estimator is to shrink the ML estimator to a value which is close to the actual value. The value to which one could shrink the ML estimate can be derived from the data itself or it can depend on some additional knowledge available to the user which could be application dependent. The modified JS estimate (305) of the channel is then given by $$\hat{H}_{JS,p} =$$
$$\overline{H} + \left(1 - \frac{(\tilde{p}-2)}{(\hat{H}_{ML,p} - \overline{H})^H Q^{-1}(\hat{H}_{ML,p} - \overline{H})}\right)^+ (\hat{H}_{ML,p} - \overline{H}) \quad \text{Equation 9}$$

where $\overline{H}$ is the p×1 vector to which the ML estimate is shrunk, i.e. it is the shrinkage target. The average value of the ML channel estimates, averaged over the pilots, can be used can be used as a possible shrinkage target. That is, $$\overline{H} = 1_p \frac{1}{p} \sum_{i=1}^{p} \hat{H}_{ML,p,i} \quad \text{Equation 10}$$

where p is the number of pilots and $1_p$ is a p×1 vector of ones. The choice of shrinking the ML channel estimates to either a single mean or to multiple local means is a problem of statistical inference and is governed by the extent of variation of the channel within the RB and the operating signal-to-noise ratio.

The noise and interference in the received OFDM samples can also be non-Gaussian, the biased estimator will still give a better performance than the corresponding ML estimate. The functional form of the biased estimator is the same as that given in equation 6, 7, 8, 9 even for non Gaussian noise/interference provided that the initial estimates (of channel or channel frequency response) on which the biased estimator operates are asymptotically Gaussian random variables with a non-singular covariance matrix. If the covariance matrix of the initial estimates on which the biased estimator operates is not known, it can be either estimated from the same set of received samples or from an independent set of received samples. The equations given for all the biased estimators can be modified to take into account the fact that the covariance matrix of the initial estimates has to be estimated At low SNRs/SINRs, when the channel variation with frequency and/or time is masked in the noisy ML estimates, noise can be averaged out by shrinking the ML estimate towards a single mean i.e. shrinkage target is given by equation 10 instead of shrinking it to multiple local means. At high SNRs/SINRs, the ML estimates can be shrunk towards multiple local means, to obtain estimates that closely capture the actual frequency and or time selectivity of the channel. Here the shrinkage target $\overline{H}=[m_1 1_a \ m_2 1_b \ \ldots \ m_n 1_g]$ can be used, where $m_i$ is the ith local mean and it is the mean of a subset of the ML estimates and $1_i$ is a 1×a vector of ones such that the dimension of $\overline{H}$ is p×1. However since low or high SNR/SINR is a qualitative term, it is more efficient to use a hypothesis test to decide whether to shrink the ML estimates towards $$\overline{H} = [m_1 1_a m_2 1_b \ \ldots \ m_n 1_g]^T \text{ or } \overline{H} = 1_p \frac{1}{p} \sum_{i=1}^{p} \hat{H}_{ML,p,i}$$

or any other suitable function of the ML estimates.

From FIG. 1, it can be determined that for the case of low speeds and frequency selective channel with high selectivity the local mean $m_1$ computed using the pilot based ML channel estimates corresponding to the first subcarrier and second subcarrier in symbols one and four may differ from the local mean $m_2$ computed using the pilot based ML channel estimates corresponding to the ninth subcarrier and tenth subcarrier in symbols three and six even in the absence of noise just due to the frequency selective nature of the channel. The local mean $m_3$ computed using the pilot based ML channel estimates corresponding to the seventeenth subcarrier and eighteenth subcarrier in symbols two and five can differ from $m_1$ and $m_2$. In the case where $m_1$, $m_2$ and $m_3$ differ "significantly" from each other, $\overline{H}=[m_1 1_a \ m_2 1_b \ \ldots \ m_n 1_g]$ is used instead of $$\overline{H} = 1_p \frac{1}{p} \sum_{i=1}^{p} \hat{H}_{ML,p,i}$$

as the shrinkage target. To decide between shrinking to a single mean or shrinking to multiple local means, in the presence of noisy estimates, it necessary to look for the possible variation of the channel over the RB by setting up a hypothesis test to check how close the individual components of the ML estimate vector $\hat{H}_{ML,p}$ are to each other (303).

Prior to shrinking the ML estimates towards a specific shrinkage target, it is necessary to test for both frequency selectivity and time selectivity of the channel to derive a suitable shrinkage target. The test for frequency selectivity and time selectivity can be independent. As an example of the hypothesis test to be used to ascertain the extent of frequency selectivity in an RB in the case when there is negligible selectivity along time, consider that the ML estimates can be grouped into disjoint clusters. Testing for frequency selectivity constitutes a multiple test of hypothesis for the numerical equality of the mean of ML estimates obtained on each of the clusters. Suppose the ML estimates are clustered into r disjoint groups, each with a mean $m_i \in X$ and variance $\sigma_i^2$, $1 \leq i \leq r$. Here the hypothesis test over the field of complex random variables is equivalent to testing the same for bi-variate normal random variables, (that is, for the real and imaginary parts of the complex random variable), with known covariances. The test is as follows:

The channel estimates in the $i^{th}$ cluster $\{\hat{H}_{p,i,ML} \sim CN(m_i, \sigma^2 I)\}$ are independent and identically distributed (i.i.d.) samples. The variance of the estimates is the same at all the pilot locations for the case of only additive white Gaussian noise with variance $\sigma^2$. Let $m_i = [\text{real}(m_i) \text{imag}(m_i)^T]$. For testing, $$H_0: m_i = m_j \text{ versus } H_1: m_i \neq m_j \forall i,j \text{ and } i \neq j \qquad \text{Equation 11}$$

The statistic, U given in equation 12 is a $\chi^2$ distributed under $H_0$.

$$U = \frac{p}{r\sigma^2}(m_i - m_j)^T(m_i - m_j) \qquad \text{Equation 12}$$

Here $H_0$ is the null hypothesis and the user can set the level of significance of the test. The more general test of test of hypothesis for the 2 sample case is given below Let $M_1, \ldots M_n \sim N(m_i, C_i)$ and $L_1, \ldots L_m \sim N(m_j, C_j)$. Be i.i.d. samples. $M_i$ is not necessarily identically distributed with $L_j$ but they are independent for all values of i,j. Suppose that n, m>p and $C_1>0$ and $C_2>0$ are known covariance matrices. For testing, $$H_0: m_i = m_j \text{ versus } H_1: m_i \neq m_j \forall i,j \text{ and } i \neq j \qquad \text{Equation 13}$$

the statistic, $$U_2 = (\overline{M}_i - \overline{L}_j)^T \left(\frac{mc_i - nc_j}{nm}\right)(\overline{M}_i - \overline{L}_i) \qquad \text{Equation 14}$$

is used that follows that follows $\chi^2(p)(p)$ distribution under $H_0$. Here $\overline{M}_i$ is the mean of the n samples $M_1, \ldots M_n$ and similarly $\overline{L}_j$ is the mean of the m samples $L_1, \ldots L_m$. If $H_0$ is not true for all the sets of data being tested, that is $m_i \neq m_j \forall i,j$ when $i \neq j$ for the specific level of significance then the shrinkage target could be $\overline{H} = [m_1 1_a \ m_2 1_b \ldots m_n 1_g]^T$.

For the system considered in the example, the pilots have been clustered into 3 groups, that is r=3. The test of hypothesis is performed on $$\binom{r}{2}$$

combinations of the clusters, which in this case evaluates to $$\binom{3}{2} = 3$$

tests. If all the tests do not satisfy the null hypothesis (304) while comparing each of the pairs of the ML estimates, then the ML estimates should be shrunk towards $\overline{H} = [m_1 1_2 \ m_3 1_2 \ m_2 1_2 \ m_1 1_2 \ m_3 1_2 \ m_2 1_2]^T$.

Otherwise the ML estimates should be shrunk towards a global mean $$\overline{H} = 1_p \frac{1}{p} \sum_{i=1}^{p} \hat{H}_{ML,p,i}$$

which in turn implies that either the channel is flat or the noise is high enough to mask the frequency selectivity of the channel, that is $m_i = m_j$ for all value of i and j.

Instead of the hypothesis outlined above, one could alternatively consider a hypothesis test on the phase of the ML estimate to determine frequency/time selectivity over the RB. The biased estimator shrinks the ML estimate towards a common mean if the frequency/time selectivity over the RB is negligible. However if the hypothesis is not true then it indicates that there is either time or frequency selectivity over the RB and hence if one does not want to lose the information the shrinkage target has to be chosen taking the time or frequency selectivity over the RB into account. The hypothesis test formulated in the previous section was based on the difference of the means of the different groups of the ML channel estimates. An alternative to the hypothesis test on the magnitude of the difference between two mean of the channel estimates (at the pilot clusters) is to test for the variation in the phase angle between any 2 local mean values. If the angle between each pair of means is significantly different from zero, then all the mean values carry different information and hence choosing a common mean over the entire RB as the shrinkage target will lead to loss of information. The probability density function (pdf) of the angle between two vector perturbed by Gaussian noise is used to setup the hypothesis test. The level of significance of the test is set by user. Consider two vectors which are perturbed versions of a given vector; the perturbation being independent additive Gaussian noise, then the cumulative density function (cdf) of the angle between the two perturbed vectors is given by $$F(\psi) = 1 - \frac{\sin(\psi)}{4\pi} \int_{-\frac{\pi}{2}}^{\frac{\pi}{2}} dt \frac{e^{-U(1-\cos(\psi)\cos(t))}}{1 - \cos(\psi)\cos(t)} \qquad \text{Equation 15}$$

where U is the energy of the original (unperturbed) vector. The following hypothesis would be tested $$H_0: \angle(m_i, m_j) = 0 \text{ versus } H_1: \angle(m_i, m_j) \neq 0 \forall i,j \text{ such that } i \neq j \qquad \text{Equation 16}$$

If the alternate hypothesis is satisfied by all the means then the shrinkage target is $\overline{H} = [m_1 1_2 \ m_3 1_2 \ m_2 1_2 \ m_1 1_2 \ m_3 1_2 \ m_2 1_2]^T$ else the shrinkage target can be $$\overline{H} = 1_p \frac{1}{p} \sum_{i=1}^{p} \hat{H}_{ML,p,i}$$

Once the biased estimates are obtained at the pilot locations, these estimates are interpolated onto the rest of the time-frequency grid. The robust 2-D MMSE filter is used for interpolation of the biased estimates in the absence of any knowledge of the channel and noise statistics. Alternatively one could use an empirical Wiener filter for interpolation which uses the statistics that are computed using the biased channel estimates.

The test of hypothesis for the equality of the local means of the channel transfer function estimates on the pilot clusters as shown in FIG. 1 have been used to decide the shrinkage target. The test of hypothesis helps to ascertain the similarity or dissimilarity of the channel transfer function at these clusters (which can be apart in time/frequency) with a confidence level of say γ=0.95. The outcome of the hypothesis test can be utilized alternatively/additionally for obtaining estimates of the channel statistics for use in designing the interpolating filter. Since the pilot clusters are very few in number, the auto-correlation function (ACF) values are computed using the cluster means and then interpolated using a suitable (For e.g., a linear) interpolator. From the channel frequency response estimates, obtained on the pilot locations, an estimate of the channel auto-correlation values for lags can be obtained as follows (306).

$$\tilde{R}(p) = \frac{1}{r}\sum_{i=1}^{r-p} m_i m_{i+p}^*$$  Equation 17 where r is the number of pilot clusters, $m_i$ is the mean of the channel estimates on the $i^{th}$ cluster. With reference to FIG. 1 the auto-correlation function for lags 0, 8 and 17 can be computed using equation 17 as follows $$R_{\tilde{H}_{IS,p},\tilde{H}_{IS,p}}(0)=\tilde{R}(0), R_{\tilde{H}_{IS,p},\tilde{H}_{IS,p}}(8)=\tilde{R}(1),$$
$$R_{\tilde{H}_{IS,p},\tilde{H}_{IS,p}}(17)=\tilde{R}(2)$$

The constructed auto-correlation and cross correlation vector can be used in equation 5 to compute the channel estimates.

The computed ACF is a better approximation to the actual ACF than using a uniform PDP for the channel. The WF that uses these ACF estimates is known as the Empirical Wiener Filter (EWF). The channel frequency response estimates over the whole RB can be obtained by using the EWF with the input being the biased channel frequency response estimates at the pilot locations (307).

Another option is that the proposed EWF could be used with the input to the filter being the ML channel frequency response estimates.

The Wiener estimator that is constructed using the estimated ACF is known as the Empirical WF. The various actions in method 300 may be performed in the order presented. Further, in some embodiments, some actions listed in FIG. 3 may be omitted.

Simulation Results:

Two transmit and two receive antennas system with the transmit antennas being virtual were considered to obtain the simulation results. A rate 1/2 channel code encoded over four RBs is used. QPSK modulation is employed. The size of one RB is 18 subcarriers-by-6 OFDM symbols. The pilot pattern is as shown in FIG. 1, with 12 pilots over the RB (in the case of virtual antenna mode). Channel estimation is performed independently over each RB. The robust 2D-MMSE filter uses the uniform ideally support limited PDP and uniform ideally support limited Doppler power spectrum assumption The existing method which applies the robust 2D-MMSE filter onto the ML estimates at the pilot location is denoted as robust 2D-MMSE in the plots. The proposed methods which apply biased estimation on the pilot location and then apply the robust 2D-MMSE filter on the biased channel estimates show significant improvement in terms of MSE, absolute phase error (PE) and block error rate (BLER) when compared with a method wherein the robust 2D-MMSE filter is applied onto the ML channel estimates at the pilot locations. The JS estimate which uses only the shrinkage target $$\overline{H} = 1_p \frac{1}{p}\sum_{i=1}^{p} \hat{H}_{ML,p,i}$$

is denoted as Proposed 1 in the plots.

The JS estimate which uses either the shrinkage target $$\overline{H} = 1_p \frac{1}{p}\sum_{i=1}^{p} \hat{H}_{ML,p,i}$$

or the shrinkage target $$\overline{H}=[m_1 1_2 m_3 1_2 m_2 1_2 m_1 1_2 m_3 1_2 m_2 1_2]^T$$

depending on the outcome of the hypothesis test is denoted as Proposed 2 in the plots.

Optimal 2D-MMSE denotes the estimator which uses the optimal PDP and Doppler profile to design the estimator. This result serves as a benchmark since one cannot obtain performance results better than the optimal 2D-MMSE with any other MMSE approach.

Figure 4:
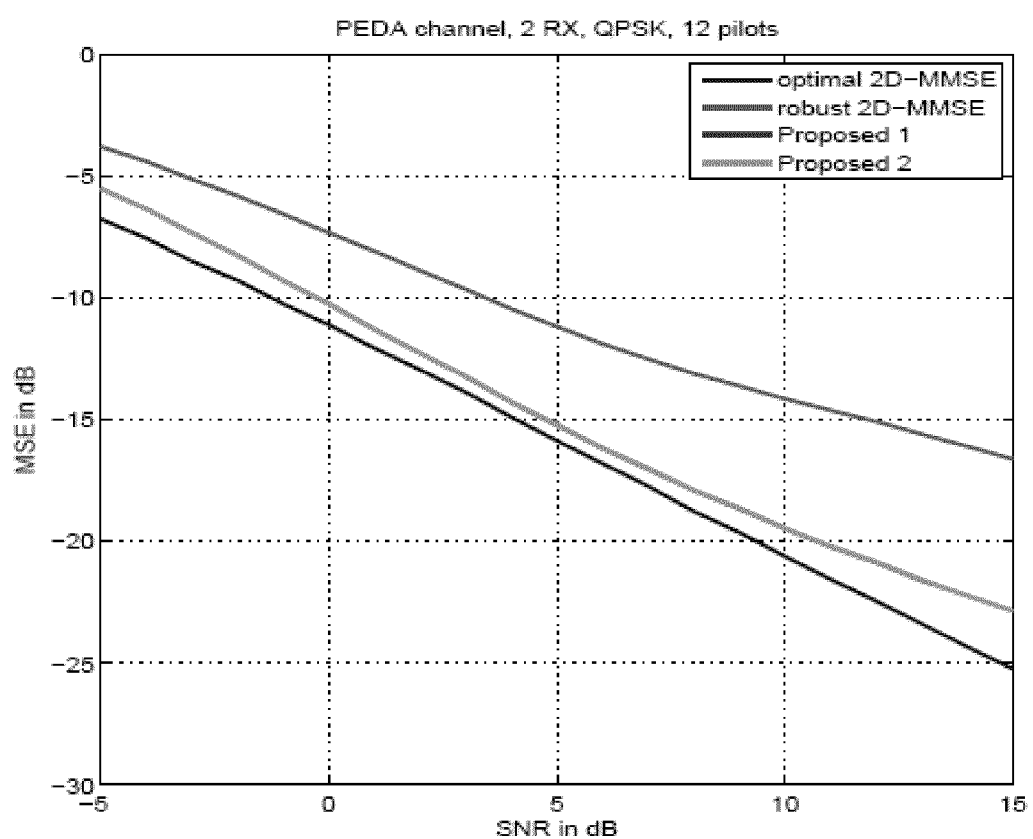
FIG. 4 shows the mean squared error performance of various estimators in the case of PED-A channel model, according to an embodiment herein.

FIG. 4 shows the mean squared error (MSE) performance of various estimators in the case of PED-A channel model. FIG. 4 shows that the performance of the proposed approaches are very close to the optimal 2D-MMSE even though the proposed approach does not use any channel statistics. A combination of biased estimation and hypothesis testing with a robust 2D-MMSE filter applied onto the biased channel frequency response estimates for interpolation is 5 dB better than when the robust 2D-MMSE filter is applied on the ML channel frequency estimates alone in terms of the mean squared error performance.

Figure 5:
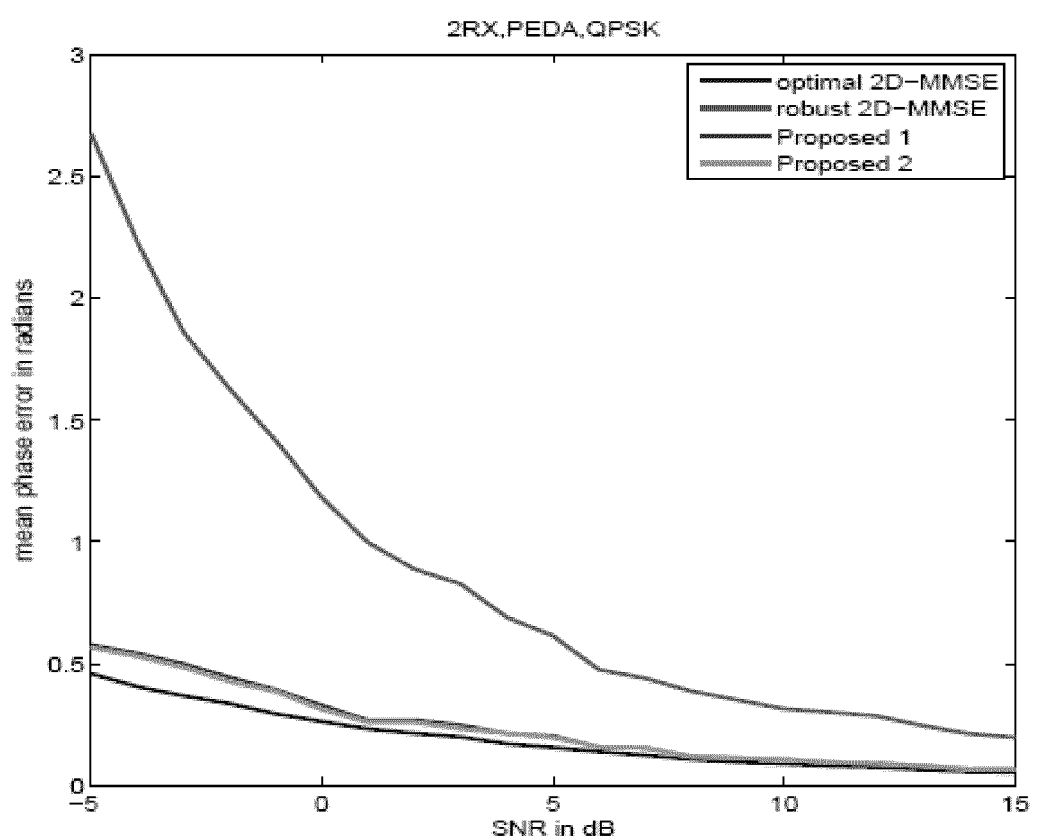
FIG. 5 shows the mean absolute phase error in radians for the case of PED-A channel model, for various estimators, according to an embodiment herein.

FIG. 5 shows the mean absolute phase error in radians for the case of PED-A channel model, for various estimators. A combination of biased estimation and hypothesis testing gives a significantly better channel phase estimates then a 2D-MMSE estimator.

Figure 6:
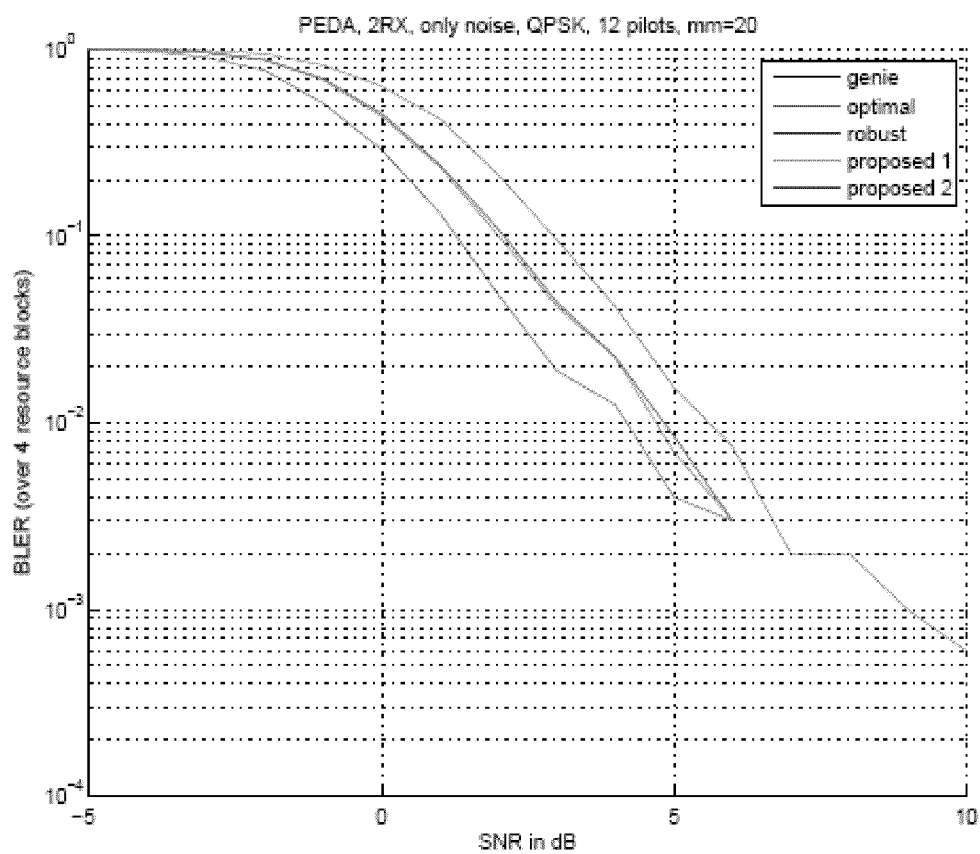
FIG. 6 shows the BLER for the case of PED-A channel model, for various estimators, according to an embodiment herein.

FIG. 6 shows the BLER for the case of PED-A channel model, for various estimators. A combination of biased estimation and hypothesis testing gives 1 dB gain over the other approaches in channel estimation.

Figure 7:
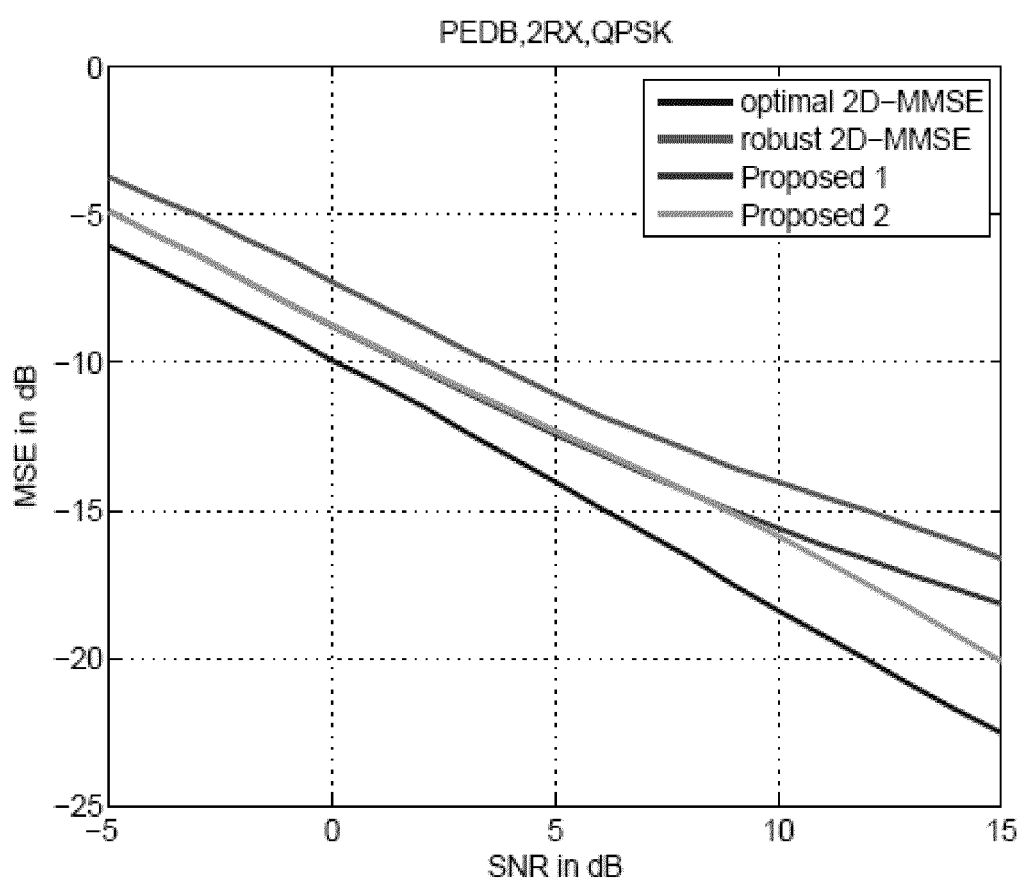
FIG. 7 shows the MSE performance for various estimators for the case of PED-B channel model, according to an embodiment herein.

FIG. 7 shows the MSE performance for various estimators for the case of PED-B channel model.

Figure 8:
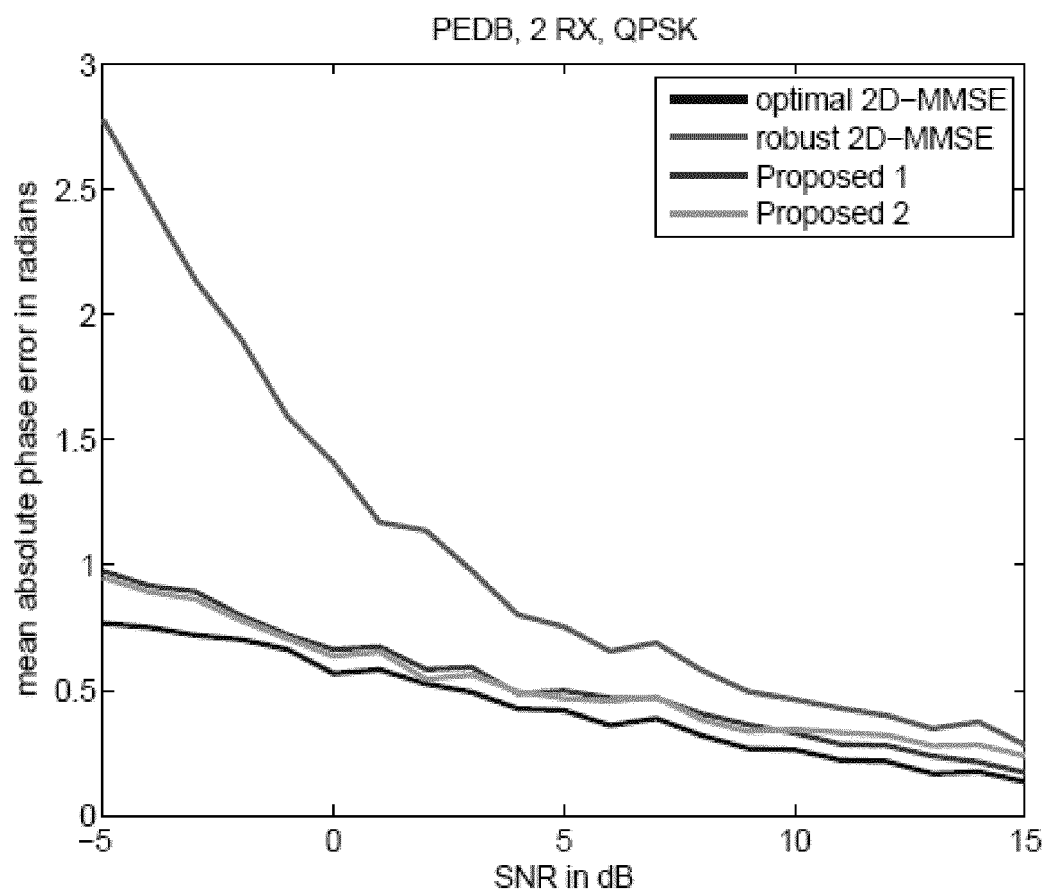
FIG. 8 shows the Mean Absolute Phase Performance for various estimators for the case of PED-B channel model, according to an embodiment herein.

FIG. 8 shows the Mean Absolute Phase Performance for various estimators for the case of PED-B channel model.

Figure 9:
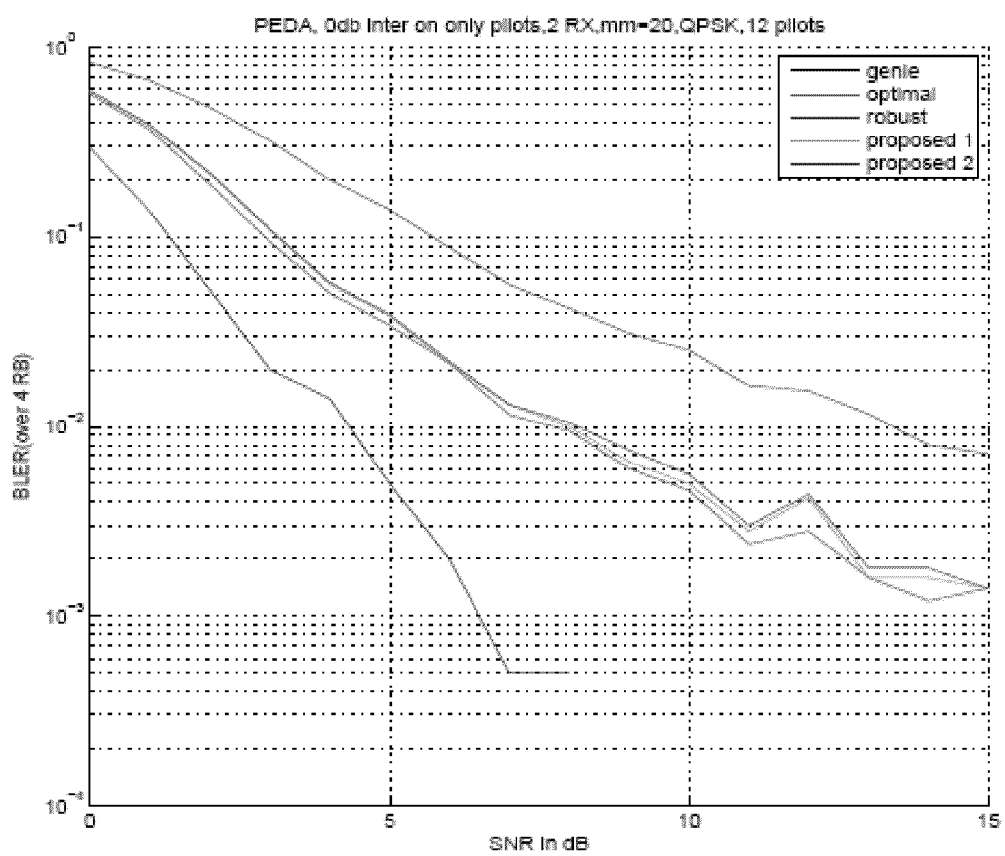
FIG. 9 shows the BLER results for PED-A channel model in the presence of 0 dB interference, according to an embodiment herein.

FIG. 9 shows the BLER results for PED-A channel model in the presence of 0 dB interference. It is assumed that the data symbols do not see any interference due to clever scheduling. The 0 dB interference is only on pilots. In this case the combination of biased estimation and hypothesis testing gives significantly better channel estimates then other approaches.

Figure 10:
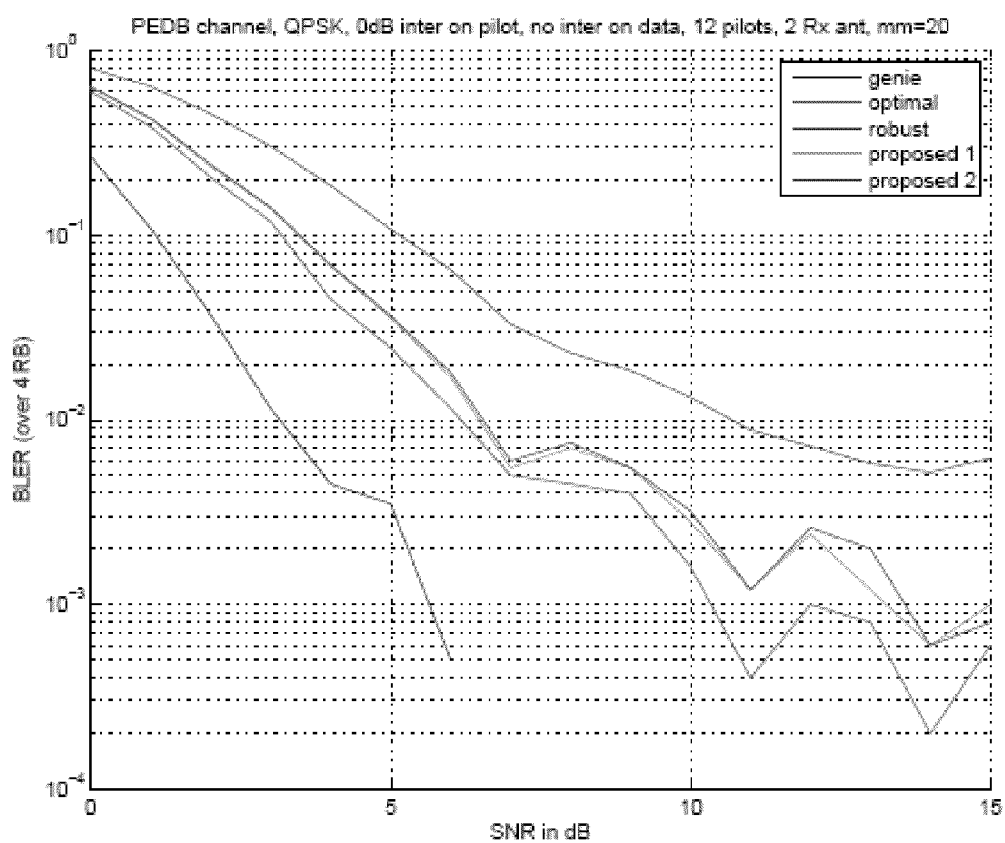
FIG. 10 shows the BLER results for PED-B channel model in the presence of 0 dB interference, according to an embodiment herein.

FIG. 10 shows the BLER results for PED-B channel model in the presence of 0 dB interference. It is assumed that the data symbols do not see any interference due to clever scheduling. The 0 dB interference is only on pilots. In this case the combination of biased estimation and hypothesis testing gives significantly better channel estimates then other approaches in channel estimation.

The embodiments disclosed herein can be implemented through at least one software program running on at least one hardware device and performing network management functions to control the network elements. The network elements blocks which can be at least one of a hardware device, or a combination of hardware devices and software modules.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for estimating a channel by a device in wireless communication systems using Orthogonal Frequency Division Multiplexing (OFDM) and Orthogonal Frequency Division Multiple access (OFDMA), the method comprising steps of:
   obtaining a Maximum Likelihood (ML) estimate of a said channel frequency response and said channel on pilot locations;
   performing a hypothesis test on said ML estimate to obtain information about a structure of said channel;
   using information obtained from said hypothesis test about said structure of said channel to derive a shrinkage target;
   obtaining refined channel frequency response estimates on said pilot locations and refined channel estimates by using a biased estimator to shrink said ML estimate towards said shrinkage target; and
   interpolating said refined channel frequency response estimates and/or said refined channel estimates using a filter to get a set of complete channel frequency response estimates and channel estimates of said channel over time-frequency block.

2. The method, as claimed in claim 1, wherein said filter is an Empirical Weiner Filter.

3. The method, as claimed in claim 1, wherein said filter is a Robust 2D-MMSE filter, said filter assuming a uniform power delay profile for said channel and further said filter assuming a uniform Doppler power spectrum.

4. The method, as claimed in claim 1, wherein said biased estimation is done using an empirical Bayesian estimator.

5. The method, as claimed in claim 1, wherein said biased estimation is done using a shrinkage estimator.

6. The method, as claimed in claim 1, wherein said biased estimation is done using an estimator of the form $$\hat{H}_{gen,p} = \overline{H} + \left(1 - \frac{r(F)}{F}\right)(\hat{H}_{ML,p} - \overline{H})$$

where $\hat{H}_{ML,p}$ is said ML estimate, $$F = \frac{(\hat{H}_{ML,p} - \overline{H})^H (\hat{H}_{ML,p} - \overline{H})}{S},$$

$r(\bullet)$ is a monotone non-decreasing function with the condition that $$0 \le r(.) \le \frac{2(p-2)}{(n+2)},$$

p is the number of parameters to be estimated and S is distributed as noise variance times a chi square random variable of n degrees of freedom, $\overline{H}$ is a shrinkage target of the same dimension as said ML estimates, where superscript H stands for Hermitian transpose.

7. The method, as claimed in claim 1, wherein said biased estimation is done using an estimator of the form $$\hat{H}_{gen,p} = \overline{H} + \max\left(0, 1 - \frac{r(F)}{F}\right)(\hat{H}_{ML,p} - \overline{H})$$

where $\hat{H}_{ML,p}$ is said ML estimate, $$F = \frac{(\hat{H}_{ML,p} - \overline{H})^H (\hat{H}_{ML,p} - \overline{H})}{S},$$

$r(\bullet)$ is a monotone non-decreasing function with the condition that $$0 \le r(.) \le \frac{2(p-2)}{(n+2)},$$

p is the number of parameters to be estimated and S is distributed as noise variance times a chi square random variable of n degrees of freedom, $\overline{H}$ is a shrinkage target of the same dimension as said ML estimates, notation max(a,b) referring to the maximum of a and b.

8. The method, as claimed in claim 1, wherein said biased estimation is done using an estimator which is given component wise by $$\hat{H}_{gen1,p,i} = \overline{H}_i + \left(1 - \frac{(p-2)S}{(n+2)T_i}\right)(\hat{H}_{ML,p,i} - \overline{H}_i)$$

where, p is the number of parameters to be estimated and S is distributed as noise variance times a chi square random variable of n degrees of freedom and $$T_i = (\alpha - 1)(\hat{H}_{ML,p,i} - \overline{H}_i)^H (\hat{H}_{ML,p,i} - \overline{H}_i) + (\hat{H}_{ML,p} - \overline{H})^H (\hat{H}_{ML,p} - \overline{H}) \text{ where } \alpha \le \frac{p}{2}$$

and $\overline{H}$ is a shrinkage target of the same dimension as said ML estimates.

9. The method, as claimed in claim 1, wherein said biased estimation is done using an estimator which is given component wise by $$\hat{H}_{gen1,p,i} = \overline{H}_i + \max\left(0, 1 - \frac{(p-2)S}{(n+)T_i}\right)(\hat{H}_{ML,p,i} - \overline{H}_i)$$

where, p is the number of parameters to be estimated and S is distributed as noise variance times a chi square random variable of n degrees of freedom and $$T_i = (\alpha - 1)(\hat{H}_{ML,p,i} - \overline{H}_i)^H (\hat{H}_{ML,p,i} - \overline{H}_i) + (\hat{H}_{ML,p} - \overline{H})^H (\hat{H}_{ML,p} - \overline{H}) \text{ where } \alpha \le \frac{p}{2} \text{ and}$$

$\overline{H}$ is a shrinkage target of the same dimension as said ML estimates.

10. The method, as claimed in claim 1, wherein said biased estimation is done using a James-Stein (JS) estimator which is of the form $$\hat{H}_{JS,p} = \overline{H} + \left(1 - \frac{(\tilde{p}-2)}{(\hat{H}_{ML,p} - \overline{H})^H Q^{-1}(\hat{H}_{ML,p} - \overline{H})}\right)(\hat{H}_{ML,p} - \overline{H})$$

where $\hat{H}_{ML,p}$ is said ML estimate of channel frequency response on said pilot locations, Q is the covariance matrix of the ML estimates $\tilde{p}$ is the trace of Q divided by the largest eigenvalue of Q, $\overline{H}$ is a shrinkage target of the same dimension as said ML estimates.

11. The method, as claimed in claim 1, wherein said biased estimation is done using a James-Stein (JS) estimator which is of the form $$\hat{H}_{JS,p} = \overline{H} + \left(0, 1 - \frac{(\tilde{p}-2)}{(\hat{H}_{ML,p} - \overline{H})^H Q^{-1}(\hat{H}_{ML,p} - \overline{H})}\right)(\hat{H}_{ML,p} - \overline{H})$$

where $\hat{H}_{ML,p}$ is said ML estimate of channel frequency response on said pilot locations, Q is the covariance matrix of the ML estimates $\tilde{p}$ is the trace of Q divided by the largest eigenvalue of Q, $\overline{H}$ is a shrinkage target of the same dimension as said ML estimates.

12. The method, as claimed in claim 1, wherein said biased estimation is done using an estimator of the form $$\hat{H}_{gen2,p} = \overline{H} + \left(I - \frac{r(F)}{F}V^{-1}Q^{-1}\right)(\overline{H}_{ML,p} - \overline{H})$$

where $\overline{H}_{ML,p}$ is said ML estimate, $F = (\overline{H}_{ML,p} - \overline{H})^H Q^{-1} V^{-1} Q^{-1} (\overline{H}_{ML,p} - \overline{H})$, where $r(\bullet)$ is an absolutely continuous function with the condition that $0 \leq r(F) \leq 2(p-2)$, p is the number of parameters to be estimated, $\overline{H}$ is a shrinkage target of the same dimension as said ML estimates, I is an identity matrix, $\hat{H}_{ML,p}^{(j)}$ the jth ML estimate from n independent identically distributed ML estimates (each with covariance matrix Q) of the same channel frequency response, $\overline{H}_{ML,p}$ is the mean of the n ML estimates, V is the weighting matrix of the weighted quadratic cost function being minimized.

13. The method, as claimed in claim 1, wherein said biased estimation is done using an estimator of the form $$\hat{H}_{gen2,p} = \overline{H} + \left(I - \frac{r(F)}{F}V^{-1}Q^{-1}\right)^+ (\overline{H}_{ML,p} - \overline{H})$$

where $\hat{H}_{ML,p}$ is said ML estimate, $F = (\overline{H}_{ML,p} - \overline{H})^H Q^{-1} V^{-1} Q^{-1} (\overline{H}_{ML,p} - \overline{H})$, where $r(\bullet)$ is an absolutely continuous function with the condition that $0 \leq r(F) \leq 2(p-2)$, p is the number of parameters to be estimated, $\overline{H}$ is a shrinkage target of the same dimension as said ML estimates, I is an identity matrix, $\hat{H}_{ML,p}^{(j)}$ denotes the jth ML estimate from n independent identically distributed ML estimates (each with covariance matrix Q) of the same channel frequency response, $\overline{H}_{ML,p}$ is the mean of the n ML estimates, V is the weighting matrix of the weighted quadratic cost function being minimized and $$\left(I - \frac{r(F)}{F}V^{-1}Q^{-1}\right)^+ = P^{-1}\text{diag}\left[\max\left(0, 1 - \frac{r(F)}{F}d_1^{-1}\right), \ldots, \max\left(0, 1 - \frac{r(F)}{F}d_p^{-1}\right)\right]P$$

where P is a non singular matrix such that $PV^{-1}P=I$ and $PQ^{-1}P=D=\text{diag}(d_1, \ldots, d_p)$, where $\text{diag}(d_1, \ldots, d_p)$ is a p×p diagonal matrix.

14. The method, as claimed in claim 1, wherein covariance matrix required for the biased estimation method is estimated from said received OFDM samples itself using a maximum likelihood estimator.

15. The method, as claimed in claim 1, wherein said shrinkage target is the origin.

16. The method, as claimed in claim 1, wherein said shrinkage target is a matrix/vector close to the actual channel matrix/vector.

17. The method, as claimed in claim 1, wherein said shrinkage target is a function of said ML estimate, where said function is at least one of:
   a mean value of said ML estimate;
   subsets of said ML estimates shrunk to means of individual subsets; and
   an order statistic of said ML estimate.

18. The method, as claimed in claim 1, wherein an autocorrelation and cross correlation vectors are used to compute said set of complete estimates of said channel.

19. A system for estimating a channel in wireless communication systems using Orthogonal Frequency Division Multiplexing (OFDM) and Orthogonal Frequency Division Multiple access (OFDMA), said system comprising a receiver adapted for:
   obtaining a Maximum Likelihood (ML) estimate of said channel frequency response and said channel on said pilot locations;
   performing a hypothesis test on said ML estimates to obtain information about the structure of the channel;
   using information obtained from hypothesis test about said structure of channel to derive the shrinkage target;
   obtaining refined channel frequency response estimates on pilot locations and refined channel estimates by using a biased estimator to shrink said ML estimate towards said shrinkage target; and
   interpolating said refined channel frequency response estimates and said refined channel estimates using a filter to get a set of complete channel frequency response estimates and channel estimates of said channel over a time-frequency block.

20. The system, as claimed in claim 19, wherein said system is adapted for interpolating said refined channel frequency response estimates and said refined channel estimates using an Empirical Weiner Filter.

21. The system, as claimed in claim 19, wherein said receiver is adapted for interpolating said refined channel frequency response estimates and/or said refined channel estimates using a Robust 2D-MMSE filter, said filter assuming a Uniform power delay profile for said channel and further said filter assuming a uniform Doppler power spectrum.

22. The system, as claimed in claim 19, wherein said receiver is adapted for performing said biased estimation using an empirical Bayesian estimator.

23. The system, as claimed in claim 19, wherein said receiver is adapted for doing biased estimation using a shrinkage estimator.

24. The system, as claimed in claim 19, wherein said receiver is adapted for doing biased estimation using an estimator of the form $$\hat{H}_{gen,p} = \overline{H} + \left(1 - \frac{r(F)}{F}\right)(\hat{H}_{ML,p} - \overline{H})$$

where $\hat{H}_{ML,p}$ is said ML estimate, $$F = \frac{(\hat{H}_{ML,p} - \overline{H})^H (\hat{H}_{ML,p} - \overline{H})}{S},$$

$r(\bullet)$ is a monotone non-decreasing function with the condition that $$0 \le r(.) \le \frac{2(p-2)}{(n+2)},$$

p is the number of parameters to be estimated and S is distributed as noise variance times a chi square random variable of n degrees of freedom, $\overline{H}$ is a shrinkage target of the same dimension as said ML estimates, where superscript H stands for Hermitian transpose.

25. The system, as claimed in claim 19, wherein said receiver is adapted for doing biased estimation using an estimator of the form $$\hat{H}_{gen,p} = \overline{H} + \max\left(0, 1 - \frac{r(F)}{F}\right)(\hat{H}_{ML,p} - \overline{H})$$

where $\hat{H}_{ML,p}$ is said ML estimate, $$F = \frac{(\hat{H}_{ML,p} - \overline{H})^H (\hat{H}_{ML,p} - \overline{H})}{S},$$

$r(\bullet)r(\bullet)$ is a monotone non-decreasing function with the condition that $$0 \le r(.) \le \frac{2(p-2)}{(n+2)},$$

p is the number of parameters to be estimated and S is distributed as noise variance times a chi square random variable of n n degrees of freedom, $\overline{H}$ is a shrinkage target of the same dimension as said ML estimates, notation max(a, b) referring to the maximum of a and b.

26. The system, as claimed in claim 19, wherein said receiver is adapted for doing biased estimation using an estimator which is given component wise by $$\hat{H}_{gen1,p,i} = \overline{H}_i + \left(1 - \frac{(p-2)S}{(n+2)T_1}\right)(\hat{H}_{ML,p,i} - \overline{H}_i)$$

where, p is the number of parameters to be estimated and S is distributed as noise variance times a chi square random variable of n degrees of freedom and $$T_i = (\alpha - 1)(\hat{H}_{ML,p,i} - \overline{H}_i)^H (\hat{H}_{ML,p,i} - \overline{H}_i) +$$
$$(\hat{H}_{ML,p} - \overline{H})^H (\hat{H}_{ML,p} - \overline{H}) \text{ where } \alpha \le \frac{p}{2}$$

and $\overline{H}$ is a shrinkage target of the same dimension as said ML estimates.

27. The system, as claimed in claim 19, wherein said receiver is adapted for doing biased estimation using an estimator which is given component wise by $$\hat{H}_{gen1,p,i} = \overline{H}_i + \max\left(0, 1 - \frac{(p-2)S}{(n+)T_i}\right)(\hat{H}_{ML,p,i} - \overline{H}_i)$$

where, p is the number of parameters to be estimated and S is distributed as noise variance times a chi square random variable of n degrees of freedom and $$T_i = (\alpha - 1)(\hat{H}_{ML,p,i} - \overline{H}_i)^H (\hat{H}_{ML,p,i} - \overline{H}_i) +$$
$$(\hat{H}_{ML,p} - \overline{H})^H (\hat{H}_{ML,p} - \overline{H}) \text{ where } \alpha \le \frac{p}{2} \text{ and }$$

$\overline{H}$ is a shrinkage target of the same dimension as said ML estimates.

28. The system, as claimed in claim 19, wherein said receiver is adapted for doing biased estimation using a James-Stein (JS) estimator which is of the form $$\hat{H}_{JS,p} = \overline{H} + \left(1 - \frac{(\tilde{p} - 2)}{(\hat{H}_{ML,p} - \overline{H})^H Q^{-1}(\hat{H}_{ML,p} - \overline{H})}\right)(\hat{H}_{ML,p} - \overline{H})$$

where $\hat{H}_{ML,p}$ is said ML estimate of channel frequency response on said pilot locations, Q is the covariance matrix of the ML estimates $\tilde{p}$ is the trace of Q divided by the largest eigenvalue of Q, $\overline{H}$ is a shrinkage target of the same dimension as said ML estimates.

29. The system, as claimed in claim 19, wherein said receiver is adapted for doing biased estimation using a James-Stein (JS) estimator which is of the form $$\hat{H}_{JS,p} = \overline{H} + \left(0, 1 - \frac{(\tilde{p} - 2)}{(\hat{H}_{ML,p} - \overline{H})^H Q^{-1}(\hat{H}_{ML,p} - \overline{H})}\right)(\hat{H}_{ML,p} - \overline{H})$$

where $\hat{H}_{ML,p}$ is said ML estimate of channel frequency response on said pilot locations, Q is the covariance matrix of the ML estimates $\tilde{p}$ is the trace of Q divided by the largest eigenvalue of Q, $\overline{H}$ is a shrinkage target of the same dimension as said ML estimates.

30. The system, as claimed in claim 19, wherein said receiver is adapted for doing biased estimation using an estimator of the form $$\hat{H}_{gen2,p} = \overline{H} + \left(I - \frac{r(F)}{F} V^{-1} Q^{-1}\right)(\overline{H}_{ML,p} - \overline{H})$$

where $\hat{H}_{ML,p}$ is said ML estimate, $F = (\overline{H}_{ML,p} - \overline{H})^H Q^{-2} V^{-2} Q^{-2} (\overline{H}_{ML,p} - \overline{H})$, where r(•) is an absolutely continuous function with the condition that $0 \leq r(F) \leq 2(p-2)$ p is the number of parameters to be estimated, $\overline{H}$ is a shrinkage target of the same dimension as said ML estimates, I is an identity matrix, $\hat{H}_{ML,p}^{(j)}$ denotes the jth ML estimate from n independent identically distributed ML estimates (each with covariance matrix Q) of the same channel frequency response, $\overline{H}_{ML,p}$ is the mean of the n ML estimates, V is the weighting matrix of the weighted quadratic cost function being minimized.

31. The system, as claimed in claim 19, wherein said receiver is adapted for doing biased estimation using an estimator of the form $$\hat{H}_{gen2,p} = \overline{H} + \left(I - \frac{r(F)}{F}V^{-1}Q^{-1}\right)^+ (\overline{H}_{ML,p} - \overline{H})$$

where $\hat{H}_{ML,p}$ is said ML estimate, $F=(\overline{H}_{ML,p}-\overline{H})^H Q^{-1} V^{-1} Q^{-1} (\overline{H}_{ML,p}-\overline{H})$, where
r(•) is an absolutely continuous function with the condition that $0 \leq r(F) \leq 2(p-2)$, p is the number of parameters to be estimated, $\overline{H}$ is a shrinkage target of the same dimension as said ML estimates, I is an identity matrix, $\hat{H}_{ML,p}^{(j)}$ denotes the jth ML estimate from n independent identically distributed ML estimates (each with covariance matrix Q) of the same channel frequency response, $\overline{H}_{ML,p}$ is the mean of the n ML estimates, V is the weighting matrix of the weighted quadratic cost function being minimized and $$\left(I - \frac{r(F)}{F}V^{-1}Q^{-1}\right)^+ =$$

$$P^{-1}\text{diag}\left[\max\left(0, 1 - \frac{r(F)}{F}d_1^{-1}\right), \ldots, \max\left(0, 1 - \frac{r(F)}{F}d_p^{-1}\right)\right]P$$

where P is a non singular matrix such that $PV^{-1}P=I$ and $PQ^{-1}P=D=\text{diag}(d_1, \ldots, d_p)$.

32. The system, as claimed in claim 19, wherein said receiver is adapted for estimating covariance matrix required for the biased estimation method from said received OFDM samples itself using a maximum likelihood estimator.

33. The system, as claimed in claim 19, wherein said receiver is configured to use an auto-correlation and cross correlation vectors to compute said set of complete estimates of said channel.

34. The system, as claimed in claim 19, wherein said receiver is adapted for doing said hypothesis test to determine frequency and/or time selectivity of said channel over a Resource Block (RB) based on a function of said ML estimates.

35. The system, as claimed in claim 19, wherein said receiver is adapted for doing said hypothesis test to determine frequency selectivity of said channel is independent of said hypothesis test is done to determine time selectivity of said channel.

36. The system, as claimed in claim 19, wherein said receiver is adapted for doing said hypothesis test to determine frequency and time selectivity of said channel over a Resource Block (RB) based on phase of said ML estimates.

37. The system, as claimed in claim 19, wherein said receiver is adapted for using a Probability Density Function (PDF) of angle between two vector perturbed by Gaussian noise to setup said hypothesis test.

38. The system, as claimed in claim 19, wherein said receiver is adapted for using the null hypothesis to indicate that the channel is nearly flat in either time or/and frequency or that channel variability is masked by noise.

39. The system, as claimed in claim 19, wherein said receiver is adapted for taking the shrinkage target for the biased estimator as a function of the mean value of said ML estimate, if said null hypothesis is true.

40. The system, as claimed in claim 19, wherein said receiver is adapted for taking the shrinkage target for the biased estimator is of the form $\overline{H}=[m_1 1_a m_2 1_b \ldots m_n 1_g]^T$ where $m_i$ is the ith local mean and it is the mean of a subset of the ML estimates and $1_i$ is a 1×a vector of ones such that the dimension of $\overline{H}$ is equal to the dimension of said ML estimates, if said null hypothesis is not true for all local means.

41. The method, as claimed in claim 1, wherein said hypothesis test is done to determine frequency and/or time selectivity of said channel over a Resource Block (RB) based on a function of said ML estimates.

42. The method, as claimed in claim 1, wherein said hypothesis test is done to determine frequency selectivity of said channel is independent of said hypothesis test is done to determine time selectivity of said channel.

43. The method, as claimed in claim 1, wherein said hypothesis test is done to determine frequency and time selectivity of said channel over a Resource Block (RB) based on phase of said ML estimates.

44. The method, as claimed in claim 1, wherein a Probability Density Function (PDF) of angle between two vector perturbed by Gaussian noise is used to setup said hypothesis test.

45. The method as claimed in claim 1, wherein the null hypothesis indicate that the channel is nearly flat in either time or/and frequency or it indicates that channel variability is masked by noise.

46. The method as claimed in claim 1, wherein if the null hypothesis is true the shrinkage target for the biased estimator is a function of the mean value of said ML estimate.

47. The method as claimed in claim 1, wherein if the null hypothesis is not true for all the local means then the shrinkage target for the biased estimator is of the form $\overline{H}=[m_1 1_a m_2 1_b \ldots m_n 1_g]^T$ where $m_i$ is the ith local mean and it is the mean of a subset of the ML estimates and $1_i$ is a 1×a vector of ones such that the dimension of $\overline{H}$ is equal to the dimension of said ML estimates.

* * * * *